United States Patent [19]

Hammer

[11] Patent Number: 4,825,999

[45] Date of Patent: May 2, 1989

[54] CHAIN DRIVE APPARATUS

[75] Inventor: Roy B. Hammer, McMurray, Pa.

[73] Assignee: Cannon USA, Inc., Mars, Pa.

[21] Appl. No.: 52,949

[22] Filed: May 21, 1987

[51] Int. Cl.$^4$ ............................................. B65G 23/06
[52] U.S. Cl. .................................................... 198/834
[58] Field of Search ......................... 198/834, 838, 845

[56] References Cited

U.S. PATENT DOCUMENTS

| | | | |
|---|---|---|---|
| 3,155,227 | 11/1964 | Wesson | 198/834 |
| 3,595,380 | 7/1971 | Miller | 198/834 |
| 3,643,792 | 2/1972 | Resener | 198/834 |
| 3,674,130 | 7/1972 | Carmichael | 198/834 |
| 4,662,511 | 5/1987 | Greener | 198/834 |

Primary Examiner—Frank E. Werner
Assistant Examiner—Cheryl L. Gastineau
Attorney, Agent, or Firm—Cushman, Darby & Cushman

[57] ABSTRACT

A chain driving system wherein positive engagement between the driving element and the chain begins to occur only when the pitch circle of the driving element and the path of the centers of the chain link pins tangentially intersect. Such a positive engagement relationship eliminates the chordal action usually associated with chain drive systems.

11 Claims, 4 Drawing Sheets

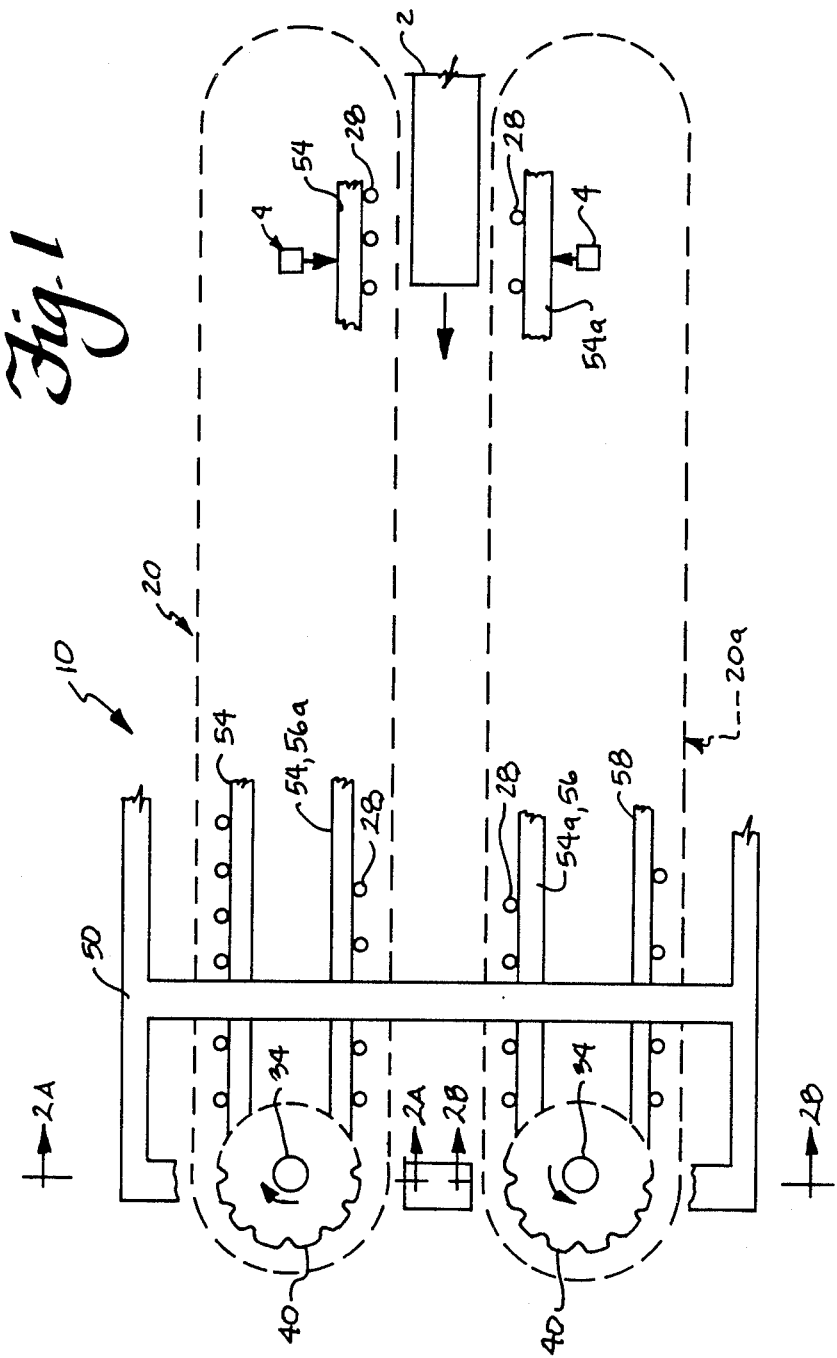

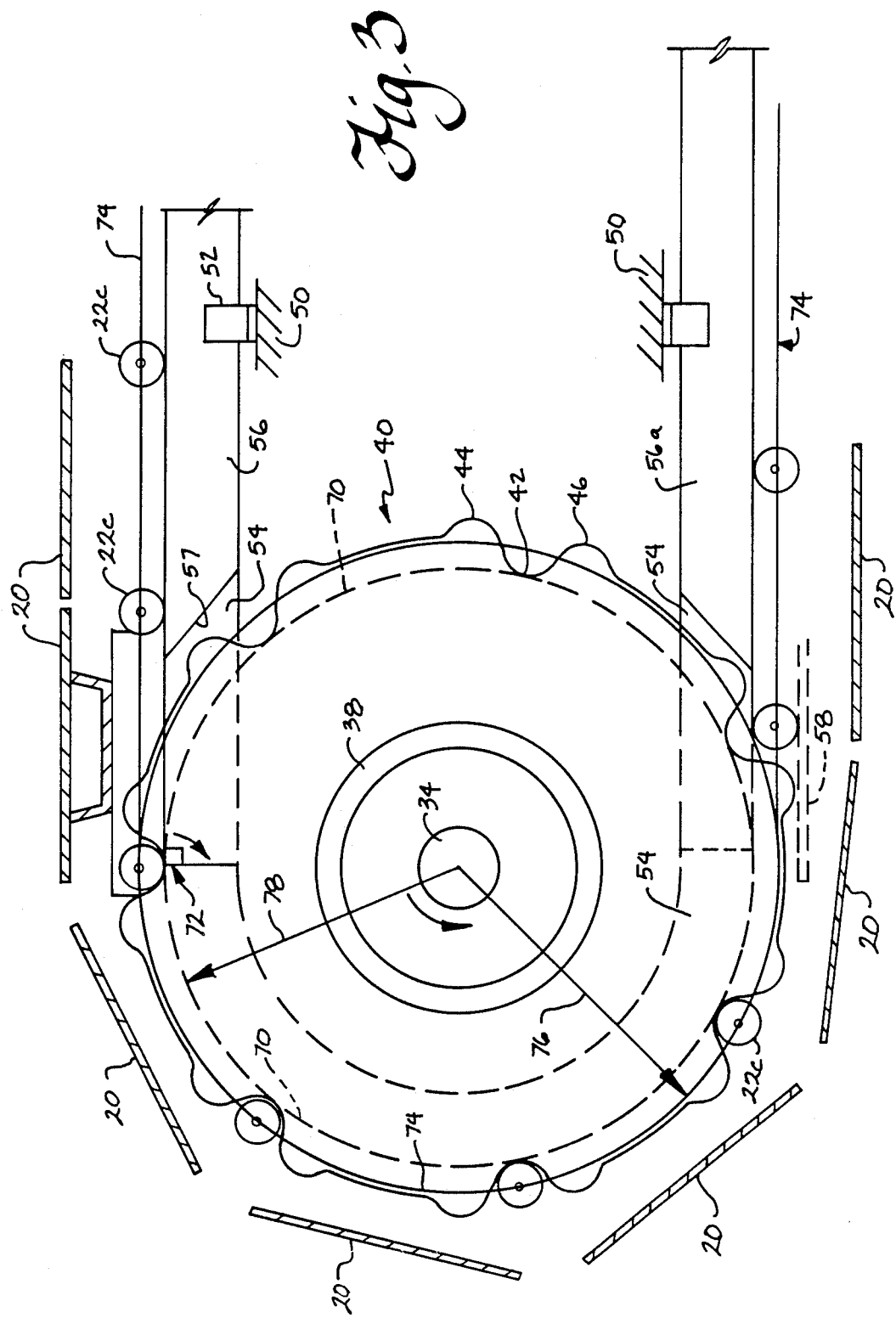

CHAIN DRIVE APPARATUS

FIELD OF THE INVENTION

This invention relates to apparatus for driving chains. More particularly, this invention relates to the elimination of the "chordal" action present in prior art chain drive systems as applied to conveyor drives.

BACKGROUND OF THE INVENTION

The operation of chain type conveyor drives is frequently characterized by irregular chain movement called chordal action. Chordal action manifests itself in the form of cyclical velocity variations of the conveyor. In conventional conveyor drives this cyclical velocity variation can be as much as 5-8% of the average velocity of the conveyor. While such variation may be tolerated in certain manufacturing processes where a smooth, continuous drive is not required; i.e., crusher feed conveyors at a quarry, more sophisticated processes; i.e., lamination processes, require the steady, even movement or progress of the manufactured good. Any variation in the speed of the conveyor, even comparatively minor, can seriously effect the integral quality of the finished product.

Of course not all types of conveyors suffer from this problem. Endless belt conveyors, which are driven by a smooth drum at either end of the curved turn arounds, do not have the requisite physical characteristics which allow chordal action to occur unless, of course, the driving drum is itself driven by a chain drive system that creates chordal action. These belt type conveyors, however, have limited use in some manufacturing processes and other problems are associated with their drive systems.

Conventional chain conveyor drive systems, on the other hand, use some form of toothed drive mechanism which engages the conveyor. The toothed drive can be in the form of either a large sprocket, usually at one end of the conveyor, which directly engages a drive chain attached to the moving portion of the conveyor, or a cat drive system which engages the conveyor at some midpoint location between the ends. In both systems, the former perhaps more than the later, chordal action is present. In the large sprocket system the chordal action effect is easily described as follows: Each successive link pin of the conveyor drive chain engages the drive sprocket at a radius point below the point of tangency between the conveyor drive sprocket and the conveyor drive chain. The velocity of the drive chain therefore increases as the link pin is pulled or raised upwardly to the point of tangency. This occurs because the perpendicular vector component of the velocity imparted by the drive sprocket to the link pin goes to zero while the vector component of velocity parallel to the direction of conveyor travel is maximized. This cyclical increase in the parallel or horizontal vector will cause a jump in conveyor movement.

Use of a cat drive system for conveyors will reduce but not eliminate chordal action. In such a cat drive, protruding teeth are mounted on a smaller chain, directly driven through reduction gearing by an electric motor, with those teeth engaging the conveyor drive pins, which protrude from the under side of the conveyor, so that the conveyor is moved along. At the point of disengagement, the tooth on the smaller chain is pulled away from the conveyor drive pins as it wraps around its own drive sprocket.

Since the cat drive is itself a miniature chain drive system, chordal action is inherent in its operation. Although chordal action is reduced, as compared to a large sprocket drive, it is nonetheless present and uneven motion is imparted thereby to the driven conveyor. Again, a steady, even, conveyor velocity is not achieved.

Many methods of eliminating chordal action in chain drives have been tried: Larger drive sprockets with greater numbers of smaller dimensioned teeth; offset drive sprockets which halve the action, for an otherwise equal amount of driving teeth; scrupulously machined sprockets with precision alignment, etc. None of these methods, however, has succeeded.

The present invention eliminates the cyclical velocity variations of chain drives by ridding the drive system of the physical characteristics of conventional chain drives which cause the chordal action.

SUMMARY OF THE INVENTION

The present invention eliminates chordal action by modifying the drive assembly concept for a main conveyor drive chain. The driving relation between the drive sprocket and the driven chain is arranged such that positive engagement begins to occur at a point where the chain and sprocket are tangentially related.

The driven conveyor chain, which includes link pins, is supported on each side of a centrally positioned drive sprocket. The conveyor support in particular, is arranged so that the outer sides of the conveyor are supported on precisely fixed support rails which have curved end portions that extend parallel to the pitch circle of the central drive sprocket. The central drive sprocket is machined and aligned such that the link pins of the conveyor drive chain first contact the drive sprocket at the point of tangency between the path followed by the centers of the conveyor chain link pins and the pitch circle of the drive sprocket. The drive sprocket is designed with appropriately shaped notches to both receive the link pins at this point of tangency and to maintain the position of the link pins at a constant radius from the center of the drive sprocket as they are pulled through the driving arc of 180° while in engagement with the drive sprocket.

The chain link support rails are also constructed to maintain the link pins away from the pitch circle of the drive sprocket until the link pins and the pitch circle of the sprocket are tangentially related. Thus, since the link pins and the drive sprocket do not come into driving relation until the only element of sprocket velocity imparted to the link pin is along a path which is colinear to the path of travel of the link pin, there can be no chordal action.

Other objects, features, and characteristics of the present invention, as well as the methods and operation and functions of the related elements of the structure, and to the combination of parts and economies of manufacture, will become apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 1 is a schematic representation of a laminator which uses the present invention chain drive apparatus.

FIG. 3 is a side elevational view along section 3—3 of FIG. 2.

DETAILED DESCRIPTION OF THE PREFERRED EMBODIMENT

Figure 2B:
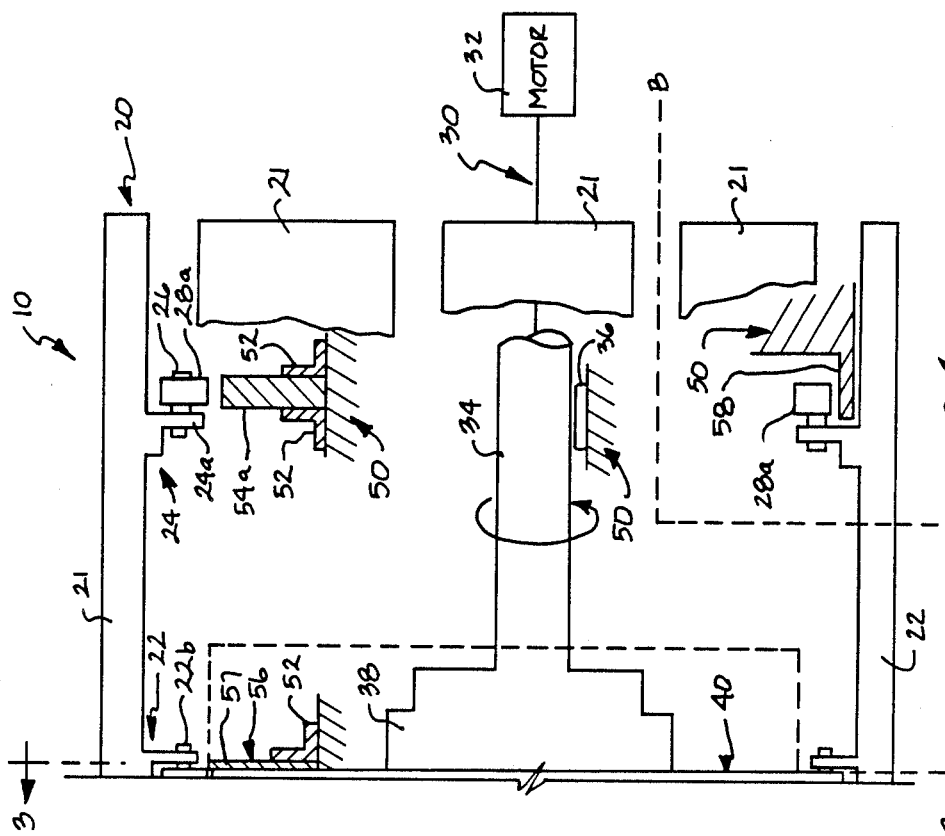
FIG. 2B is a partial cross-sectional view of the lower conveyor taken along line 2B—2B of FIG. 1.
Figure 2A:
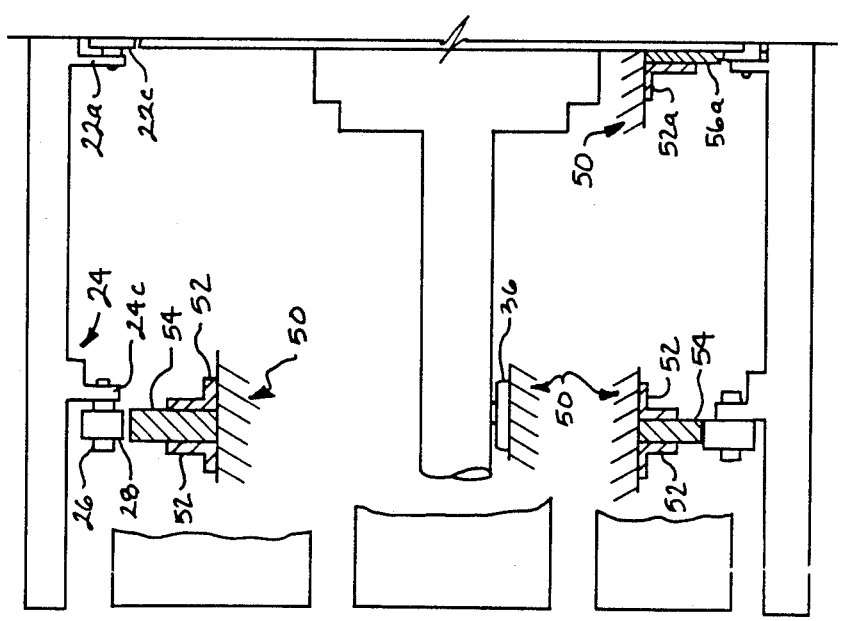
FIG. 2A is a partial cross-sectional end view of a conveyor chain drive apparatus embodying the present invention along line 2A—2A of FIG. 1.

FIG. 1 illustrates a schematic of a laminator machine using the present invention conveyor drive. The laminator comprises a conveyor assembly 10 having upper and lower conveyor slat assemblies 20 and 20a, respectively. The conveyor slats extend across the entire width of the conveyor with a plurality of such slats being pivotally connected together, side by side, to form an endless conveyor slat assembly. The upper and lower conveyor slat assemblies 20 and 20a ride on and are supported by wheeled followers 28, as shown in FIGS. 1, 2A and 2B, which are positioned outboard of the center and in turn operate along and are supported by support rails 54, 54a, and 58. The upper conveyor employs a pair of continuous outboard support rails 54. The lower conveyor has a pair of outboard support rails comprised of a first portion in the form of rail segment 54a, that extends along the upper portion of the lower conveyor 20a as well as about each end, together with a pair of lower support rail segments 58 that span the distance between the end points of rail segments 54a. The upper and lower conveyors require different support rails because of their intended unction. Upper conveyor 20 is urged downwardly against the laminated product 2 by hydraulic actuator 4. Since the hydraulic actuator 4 pushes from above the support rail 54, wheeled followers 28 must ride beneath the support rail 54 in order to be acted on by hydraulic actuator 4. Conversely, the bottom conveyor 20a has the hydraulic actuators 4 associated with the discontinuous upper support rail 54a whereas lower support rail 58 merely acts as a return support for the returning slats of the lower conveyor.

Additionally, both upper and lower conveyor slat assemblies 20 and 20a respectively have a center support rail segment 56, 56a associated therewith for supporting the center wheeled followers 22c. Thus, each conveyor 20 and 20a has a center support rail segment to support the center portions of the conveyor slats adjacent the product 2.

The support rails 54, 54a, 56, 56a, and 58 are conventionally supported by and attached to frame assembly 50. Since laminator conveyors generally accommodate laminated products of varying thicknesses, the conveyor slat assemblies 20 and 20c and their associated support rails are conventionally mounted on surrounding frame assembly 50 so as to accommodate limited vertical adjustment.

FIG. 2A illustrates an end view of the driven end of conveyor 20. As shown, the conveyor assembly 10 comprises the following major subassemblies: conveyor slat assembly 20; drive assembly 30; sprocket 40; and frame assembly 50.

Conveyor slat assembly 20 is comprised of plurality of slat members 21 each of which is supported by a center wheeled follower support assembly 22 and outboard wheeled follower support assemblies 24. The support assemblies 22 and 24 are mounted of the underside of the slat members 21 and provide rolling support against the underlying support rails. To this end, wheeled followers 22c and 28 ride along and are supported by their associated support rails. Wheeled follower support assemblies 24 are comprised of an extended bracket portion 24a with an axle 26 inserted therethrough which engages and allows rotation of wheeled follower 28. Center wheeled follower support assembly 22 comprises an extended bracket portion 22a with axle 22b inserted therethrough which engages and allows rotation of wheeled follower 22c.

As previously noted, each of the support rails 54, 54a, and 56 are attached so as to be vertically adjustable relative to frame assembly 50 to accommodate differently sized laminated products between the upper and lower conveyors. Frame assembly 50 provides general support for the conveyor system and is itself of conventional design and is, therefore, shown merely as an attachment surface in FIGS. 2A and 2B.

The slat members that together form conveyor slat assembly 20 are engaged and driven by sprocket 40. Sprocket 40 is in turn driven by driving assembly 30 comprised of a motor 32 which is drivingly connected to drive shaft 34 which in turn is connected in any convenient fashion to sprocket mounting assembly 38 which in turn drivingly supports sprocket 40. Drive shaft 34 rotates in and is supported by suitable roller bearings, generally indicated at 36.

Detail B in the right side of FIG. 2B illustrates the bottom conveyor 20a return support rail segment 58. A lower conveyor wheeled follower 28a is supported along the top portion of the lower conveyor 20a by support rail segment 54a. Rail segment 54a has curved end portions which provide continuous support for wheeled follower 28a as the conveyor is engaged by sprocket 40. As a lower conveyor slat approaches the bottom of the curved end portion of rail segment 54a wheeled follower 28a rolls onto lower support rail segment 58 and is thus continuously supported by either rail segment 54a or 58, throughout. Hence, where support rails 54 for the upper conveyor 20 are continuous, the support rail segments 54a and 58 for the lower conveyor 20a are discontinuous. Wheeled follower 28 rides along support rail segments 54a as slat 21 contacts product 2 and through the driving arc. After the lower conveyor has been acted on by its associated drive sprocket, wheeled follower 28a rides above, and is supported by, return support rail segment 58.

As previously noted, the upper and lower conveyors 20 and 20a each have an associated center support rail segment 56 or 56a. Since the drive pins/wheeled follower 22c only require support when the associated slat 21 is in contact with laminated product 2, upper conveyor 20 may only have a center support rail 56a along its bottom side. Likewise, bottom conveyor 20a may only have a center support rail 56 along its top side.

FIG. 3 is a side view of drive sprocket 40 as its drives conveyor assembly 20. The view is taken along line 3—3 of FIG. 2A. FIG. 3 illustrates the relationships which are critical to the successful construction of the present invention. Rail 54 is shown as continuing around the end of the conveyor by a pair of dotted lines behind sprocket 40 in FIG. 3. The outer or working surface of rail 54, engaged by wheeled followers 28 and along which they move, corresponds to the outermost of that pair of dotted lines. Thus, as shown in FIG. 3, wheeled followers 28 remain in engagement with the working surface of rail 54 as sprocket 40 drives the conveyor. Similarly, center support rail 56 has a working surface engaged by wheeled followers 22c and along which they move. Rail 56 stops adjacent sprocket 40 and wheeled followers 22c are, in turn, engaged by sprocket 40, particularly within notches 42 as explained below.

This outermost dotted line is also characterized by radius 78 and because it passes tangentially past the bottom of notches 42 it constitutes the root circle 70 of sprocket 40.

The center or center line of wheeled followers 22c, those operating along the middle or center rail 56, follow path 74. This path could be called a pitch line along the portion lying parallel to and adjacent rail 56. Path 74 also continues around the curved end of the conveyor 20 and is referenced by the pitch radius 76. The curved portion of path 74 also corresponds to the pitch circle of sprocket 40. Particularly, the following geometric relationships must be observed: the pitch circle (the pitch circle being the effective drive imparting diametric size of a circular drive member) of drive sprocket 40 must not cross path 74 followed by drive pins 22c. Instead, the path 74 must become tangent to pitch circle at point of engagement 72. Point 72 represents the location at which drive pin wheeled follower 22c and drive sprocket 40 may first come into positive engagement. Thus, because wheeled followers 22c engage the bottom of notches 42, this initial positive engagement between sprocket 40 and wheeled followers 22c occurs at a point of tangency between the working surface of the support rail and the root circle 70 of sprocket 40. By eliminating the possibility of premature contact between the drive pin wheeled follower 22c and the drive sprocket 40 such a tangential relationship between path 74 and drive pins wheeled followers 22c eliminates the possibility that drive sprocket 40 could impart cordal action, to conveyor assembly 20. Since the only driving action imparted by sprocket 40 to drive pin wheeled follower 22c is in a direction colinear to the path of travel 74, cordal action is a physical impossibility.

The support rails 54, 56, and 54a collectively support their associated wheeled followers not only along parallel paths but on a substantially common horizontal plane. When the center support rail 56 terminates just ahead of drive sprocket 40, as shown at 57 in FIG. 3, the side support rails 54 and 54a must continue to support, through slat 21, the center drive pins/wheeled follower 22c along path 74. It is essential that drive pin/wheeled follower 22c not engage drive sprocket 40 until the point of tangency 72 is reached. Hence, the outboard support rails 54 and 54a need not be aligned at the same level as center rail 56, but they must, in combination with slat member 21 (or other connecting structure), maintain drive pin/wheeled follower 22c along tangential path 74. That is, the spatial relationship between pitch radius 76 and radius 78 of the side support rails must be a constant. As long as the side support rails are able, through the associated slat structure, to maintain the tangential relationship between the pitch circle and path 74 up to the point of positive engagement 72, they may be arranged in any relative but parallel alignment.

Drive sprocket 40 has machined notches 42 located thereon so as to align with and drivingly engage wheeled follower 22c. In order to achieve a non-contacting relationship between the sprocket 40 and wheeled follower 22c until the point of tangency 72 is reached, the leading machined tooth 44 and the trailing machined tooth 46 must be precisely shaped. The leading tooth 44 is curved to travel beneath the drive pin immediately prior to engagement, similarly the trailing tooth 46 is curved to travel above a drive pin immediately following engagement.

Also shown in FIG. 3, in phantom lines, is the previously discussed relationship between discontinous rail segments 54a and 58. As shown, rail segment 54a follows a path similar to the path of upper rail member 54, except that member 54a terminates just as support member 58 begins. Thus, a given wheeled follower associated with lower conveyor 20a is continuously supported either by an upper discontinuous rail member 54a or by a lower discontinuous rail member 58.

Figure 4:
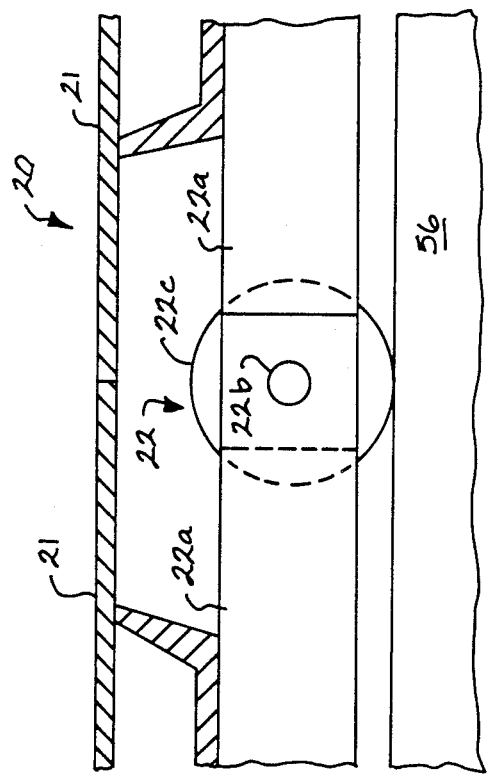
FIG. 4 is an enlarged view of a conveyor slat link pin used with the present invention.

FIG. 4 illustrates how adjacent conveyor assemblies 20 are connected. Extended bracket portions 22a from adjacent slat assemblies overlap and share a common drivepin/wheeled follower axle 22b. Thus, axle member 22b acts as a link pin between conveyor assemblies. The entire conveyor assembly may be considered as a chain wherein the links are conveyor assemblies and the link pins are wheeled follower axles. In this manner, it is easily seen that the present invention can equally apply to non-conveyor oriented chain assemblies.

The general notion of link pin supported chain drive, as disclosed herein with regard to a chain driven conveyor apparatus, can be applied in any situation where precision chain drive operation, i.e., cordal action free, is required. Such instances may include, but are not limited to, any situation where a chain drive would be useful over other forms of endless drive systems. Such applications of cordal action free chain drive need not be heavy industrial situations, two such examples would be: record player turntable drives and tape drives for audio or visual playing/recording machines. As such, the choice of materials for the various components of drive systems can include a wide range, depending on the particular application as well as any anticipated stress and wear.

The instant conveyor chain drive system is composed largely of steel, with hardened steel being used at locations where wear is expected. Such locations would include the sprocket 40, and the drive pins/wheeled followers. The presently disclosed conveyor system is, of course, a heavy industrial application of the present cordal action free drive apparatus. Lighter duty applications might use a combination of materials, such as resinous plastics (both reinforced and unreinforced), or lighter metal alloys.

While the invention has been described in connection with what is presently considered to be the most practical and preferred embodiment, it is to be understood that the invention is not to be limited to the disclosed embodiment, but on the contrary, is intended to cover various modifications or equivalent arrangements included within the spirit and scope of the appended claims.

What we claim is:
1. Apparatus for driving a conveyor, comprising:
   means defining an endless conveyor having top and bottom sides, said conveyor being supported by at least two parallel support rail assemblies, each of said rail assemblies including upper and lower flights and curved end portions with a radius $R_2$ connecting with the upper and lower flights, drive engaging means attached to said conveyor means for supporting and propelling said conveyor means, said drive engaging means having a centerline;

drive means situated adjacent at least one end of the conveyor apparatus, for driving and positively engaging said drive engaging means;

said drive means having a pitch circle radius $R_1$ dimensioned so as to be in a constant relative relation to radius $R_2$; and said support rails supporting said endless conveyor through the curved end portion so that the path followed by the centerline of said drive engaging means and the pitch circle of said drive means are related in a tangential manner.

2. Apparatus as in claim 1 wherein said drive means has a root circle radium $R_3$ which is substantially equal to radius $R_2$.

3. Apparatus as in claim 1 wherein positive engagement between said drive means and said drive engaging means does not occur until the path followed by the centers of said drive engaging means and said pitch circle radius are perpendicular.

4. Apparatus as in claim 3 wherein said drive engaging means further comprises support rail engaging conveyor support and linking means for supporting and connecting said endless conveyor, and wherein said drive engaging means are wheeled followers.

5. Apparatus as in claim 4 wherein said drive means is circular and comprises a machined sprocket with one or more notches evenly spaced around its periphery for engaging the drive engaging means.

6. Apparatus for driving a chain driven conveyor, comprising:

an endless conveyor, having a top side and a bottom side, and being supported along part of its bottom side length by at least two parallel support rails, each of said support rails having curved end portions, and said bottom side having drive engaging and support rail engaging conveyor linking means attached thereto;

circular drive means situated adjacent at least one pair of said curved end portions, said circular drive means positively engaging the drive engaging means of said endless conveyor; and said circular drive means having a pitch circle being dimensioned and said endless conveyor being supported by said support rails so that positive engagement of said drive engaging means begins to occur only when the pitch circle of said circular drive means and the path followed by the edge of said drive engaging means are tangentially related.

7. Apparatus as in claim 6 wherein the pitch radius, $R_1$, of said circular drive means and the radius, $R_2$, of the path followed by said support rail engaging conveyor, linking means are substantially equal.

8. Apparatus as in claim 7 wherein positive engagement between said circular drive means and said drive engaging means does not occur until the path followed by said drive engaging conveyor linking means and said pitch radius are perpendicular.

9. Apparatus as in claim 8 wherein said drive engaging and said support rail engaging means are wheeled followers.

10. Apparatus as in claim 9 wherein said circular drive means is a machined sprocket with notches evenly spaced around its periphery for engaging the drive engaging wheeled followers.

11. Apparatus for driving an endless conveyor, comprising:

an endless conveyor, having a top side and a bottom side, said bottom side being supported along part of its length by at least two support rails, each of said support rails having semicircular end portions; said bottom side also having support rail engaging conveyor linking and conveyor drive engaging wheeled followers attached thereto;

sprocket drive means located between at least one end of said semi-circular end portions, said sprocket drive means positively engaging said conveyor drive engaging means; and said sprocket drive means having a pitch radius dimensioned to be equal to the radius of the path followed by the center of said wheeled followers as said wheeled followers track along said semi-circular end portions of said support rails; and positive engagement between said sprocket drive and said conveyor drive engaging wheeled following occurring when the path followed by said drive engaging wheeled followers and said pitch radius are perpendicular.

* * * * *